Dec. 16, 1924.                                                                 1,519,517
M. K. THAYER
VALVE ACTUATING ATTACHMENT FOR AUTOMOBILES AND THE LIKE
Filed March 26, 1924

WITNESSES

Lawrence O. Hankin

INVENTOR
M. K. Thayer,
BY
ATTORNEYS

Patented Dec. 16, 1924.

1,519,517

UNITED STATES PATENT OFFICE.

MARSHALL KNIGHT THAYER, OF CASPER, WYOMING.

VALVE-ACTUATING ATTACHMENT FOR AUTOMOBILES AND THE LIKE.

Application filed March 26, 1924. Serial No. 702,120.

*To all whom it may concern:*

Be it known that I, MARSHALL KNIGHT THAYER, a citizen of the United States, and a resident of Casper, in the county of Natrona and State of Wyoming, have invented certain new and useful Improvements in Valve-Actuating Attachments for Automobiles and the like, of which the following is a specification.

My present invention relates generally to valve actuating attachments, especially butterfly and similar valves as used to control cut-outs and heaters on automobiles and other motor cars where the valves, subject as they are to sticking on account of carbon laden exhaust gases, are often difficult to shift from closed to open position and vice versa. The primary object of my invention is the provision of simple inexpensive connections by means of which the valves may be moved with an initial hammer-like blow which will serve to loosen the valve when slightly stuck and in this way facilitate its movement to either open or closed position as the case may be.

Figure 1:
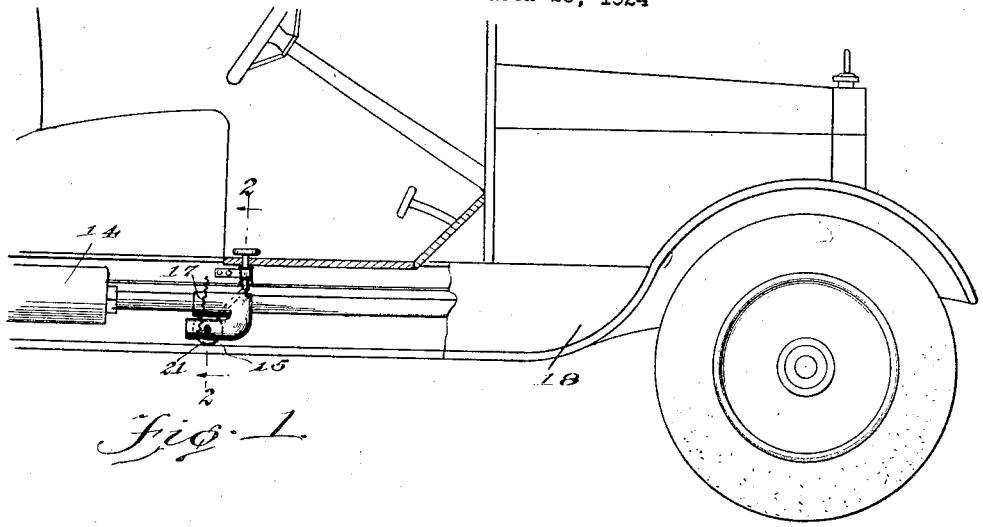
Figure 2:
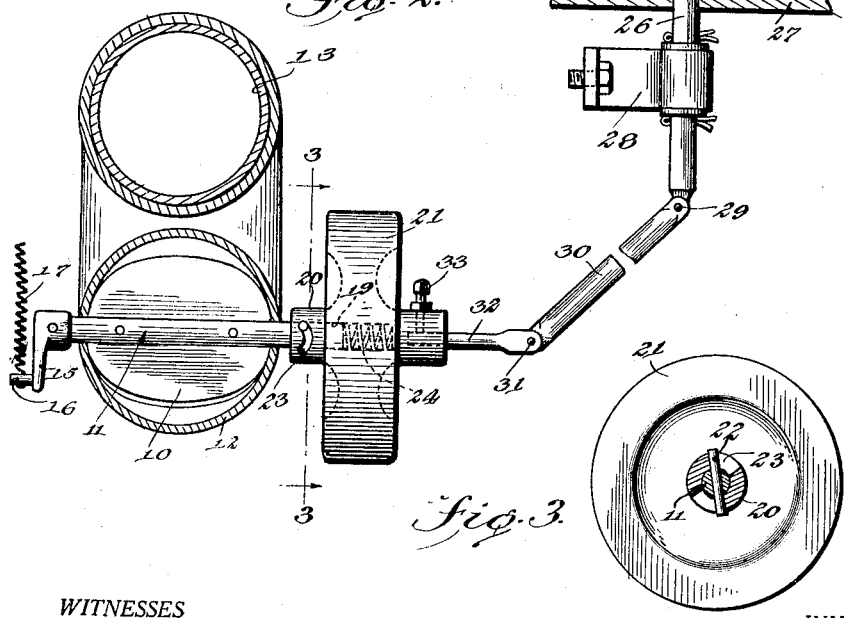
Figure 3:
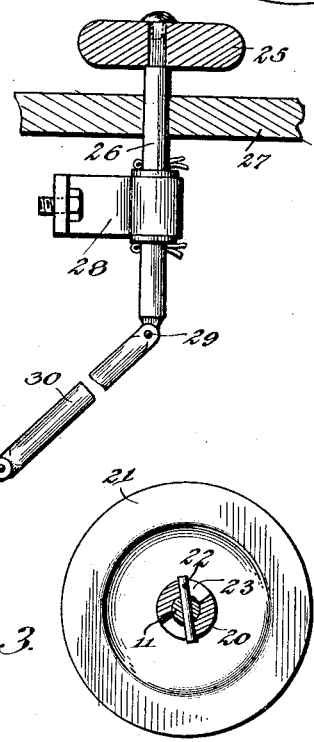

In the accompanying drawing which illustrates my present invention and forms a part of this specification, Figure 1 is a partial side view illustrating the practical application of my invention in connection with the control of a cut-out valve, Figure 2 is a vertical transverse section taken substantially on line 2—2 of Figure 1, and Figure 3 is a vertical section taken on line 3—3 of Figure 2.

Referring now to these figures I have illustrated my invention in Figures 1 and 2 in what is probably its most common use, namely the control of a cut-out valve 10 shown in the present instance of the butterfly type and including a shaft 11 or stem which is journaled diametrically through a cut-out pipe 12 adjacent to the exhaust pipe 13 whereby the exhaust gases may pass directly to the atmosphere with the valve 10 in open position instead of through a muffler 14 when the valve 10 is closed.

At one external end the valve stem or shaft 11 has a crank arm 15 which is shiftable to opposite sides of a perpendicular plane when the valve is moved to open and closed positions and which is provided with a pin 16 connected to one end of a retractile coil spring 17. This coil spring is suitably connected to a portion of the chassis of an automobile or motor car generally indicated at 18 in the perpendicular plane of the valve shaft or stem 11 so that the latter will be held in either position to which it is moved.

In accordance with my invention the opposite external end of the valve shaft or stem 11 is received within the bore 19 axially through the major portion of the length of the hub 20 of a wheel 21, the wheel being of considerable weight and being thus rotatable on the stem, its rotation with respect to the stem being limited by a pin 22 exending diametrically through the said end of the shaft or stem 11 and through arcuate slots 23 at diametrically opposite sides of the adjacent end of the hub 20. Between the inner end of the hub bore 19 and the adjacent end of the shaft or stem 11 is compressed a spring 24 and thus in the initial rotation of the wheel 21 with respect to the shaft or stem 11 the valve 10 if slightly stuck will force movement of the ends of the cross pin 22 in the slots 23. During this movement the wheel 21 will on account of the arcuate shape of the slots 23 shift lengthwise of the stem or shaft 11 further compressing the spring 24 until the ends of the pin 22 have passed the crest or midway point of the curvature of the slots 23 at which time the further movement of the wheel 21 will be comparatively rapid until the opposite ends of the slots are reached, on account of the tension of spring 24 and thus when the ends of the slots 23 are reached the parts will tend to rotate the shaft or stem 11 with a jolting or jarring action caused by the arresting of the rotation of the heavy balance wheel 21, and a hammer-like blow will be delivered to the valve and its parts tending to jar the valve loose for rotation under the inertia of the wheel 21 assisted by spring 17 until the open or closed position of the valve is reached as the case may be.

I preferably employ a hand wheel 25 for the manual rotation of the parts, secured upon the upper end of a stem 26 which may upstand through the floor board 27 of the automobile or other motor car and which is preferably journaled through a bracket 28, the lower end of the stem being universally joined at its lower end at 29 to one end of a connecting rod 30. The opposite end of this connecting rod is universally joined as at 31 through one end of a stud shaft 32 whose opposite end is secured within an axial opening in the opposite end of the hub 20 with respect to that end which the valve shaft or stem 11 enters. The stud shaft 32 may be secured in place by a set screw 33 and thus the connections are complete whereby rotation of the hand wheel 25 initially rotates the balance wheel 21 where the valve 10 happens to be stuck with the purpose in view of jarring or hammering the valve loose in the manner previously described.

My invention provides a practical, simple and efficient valve actuating arrangement especially adaptable to those valves controlling the passage of carbon laden gases of combustion to either the cut-out or heater of an automobile or other car, although nothing hereinbefore stated should be taken as limiting my invention to such use inasmuch as by very slight if any changes it may be employed and adapted for different purposes wherever it is applicable and its stated functions may be desirable.

I claim:

1. A valve having a rotatable stem for shifting the valve to open and closed positions, a balance wheel on the stem having limited rotation with respect to the stem, means for rotating the balance wheel, and means to accelerate rotation of the balance wheel as it approaches either end of its rotational movement relative to the stem whereby it is engageable with the stem with a jarring or hammering action tending to free the valve when the latter is stuck.

2. A valve having a rotatable stem to open and close the valve, a balance wheel on the stem having limited movement around the stem and longitudinally thereof, manual connections for rotating the balance wheel including jointed members permitting the balance wheel to shift lengthwise of the stem, and means to accelerate rotation of the balance wheel during its rotation relative to the valve stem whereby to bring about engagement of the rotating balance wheel and the valve stem with a jolting or hammering action against the latter adapted to free the valve when stuck.

3. A valve having a stem rotatable to close and open the valve, a balance wheel on the stem having diametrically opposed slots curved in the direction of the length of the stem, a cross pin through the stem and through said slots, a spring compressed between a portion of the balance wheel and the end of the stem within said wheel, and manual connections for rotating the balance wheel including jointed parts permitting shifting movement of the balance wheel lengthwise of the stem.

4. A valve having a stem rotatable to close and open the valve, a balance wheel on the stem having diametrically opposed slots curved in the direction of the length of the stem, a cross pin through the stem and through said slots, a spring compressed between a portion of the balance wheel and the end of the stem within said wheel, and manual connections for rotating the balance wheel including a stem having a hand wheel at one end, a stud shaft secured axially of the balance wheel, and a connecting rod universally joined at its opposite ends to the said stud shaft and to the other end of said handle stem.

5. A valve having a rotatable stem for shifting the valve to open and closed position, a balance wheel, and means for mounting the balance wheel on the stem so as to permit limited rotatable movement of the balance wheel relative to the stem and to positively connect the balance wheel to the stem at either end of its relative rotatable movement with respect to the stem, whereby the balance wheel is engageable with the stem with a jarring or hammering action tending to free the valve when the latter is stuck.

MARSHALL KNIGHT THAYER.